United States Patent [19]

Hauguth

[11] 4,440,281

[45] Apr. 3, 1984

[54] FLYWHEEL CLUTCH ASSEMBLY

[75] Inventor: Hubert Hauguth, Steinberg, Fed. Rep. of Germany

[73] Assignee: Fichtel & Sachs AG, Schweinfurt, Fed. Rep. of Germany

[21] Appl. No.: 274,394

[22] Filed: Jun. 17, 1981

[30] Foreign Application Priority Data

Jun. 21, 1980 [DE] Fed. Rep. of Germany ....... 3023294

[51] Int. Cl.³ .................... F16D 21/08; F16D 25/08; F16D 13/44
[52] U.S. Cl. .............................. 192/48.8; 192/85 CA; 192/89 B; 192/91 A; 74/7 C
[58] Field of Search ................ 192/70.13, 70.19, 48.8, 192/48.7, 91 A, 89 B, 85 CA; 74/572, 7 C

[56] References Cited

U.S. PATENT DOCUMENTS

| 4,317,435 | 3/1982 | Kohlhage ........................ 123/179 J |
| 4,346,773 | 8/1982 | Hofbauer et al. .................... 74/572 |
| 4,366,887 | 1/1983 | Hofbauer et al. .................. 192/48.1 |

FOREIGN PATENT DOCUMENTS

| 2748697 | 5/1979 | Fed. Rep. of Germany . |
| 2824730 | 12/1979 | Fed. Rep. of Germany . |
| 2824735 | 12/1979 | Fed. Rep. of Germany . |
| 2824718 | 2/1980 | Fed. Rep. of Germany . |
| 2917137 | 11/1980 | Fed. Rep. of Germany . |
| 2917138 | 11/1980 | Fed. Rep. of Germany . |
| 2024962 | 1/1980 | United Kingdom . |
| 2047357 | 11/1980 | United Kingdom . |

Primary Examiner—Rodney H. Bonck
Assistant Examiner—James J. Merek
Attorney, Agent, or Firm—Toren, McGeady and Stanger

[57] ABSTRACT

A flywheel clutch mechanism interposed between the internal combustion engine crankshaft and the transmission of a motor vehicle wherein the clutch mechanism includes a flywheel mass, a separating clutch interposed between the crankshaft and the flywheel mass, and a starting and shifting clutch interposed between the flywheel mass and the transmission. In the assembly of the clutch mechanism, the flywheel mass, the separating clutch, and the starting and shifting clutch are all arranged to be initially mounted on the transmission side thereof and operatively supported thereat with the clutch disc of the separating clutch and the crankshaft being joined together so as to be nonrotatable relative to each other by a rotatively interlocking connection formed during the assembly of the combustion engine and the transmission.

15 Claims, 6 Drawing Figures

FLYWHEEL CLUTCH ASSEMBLY

The present invention relates generally to a clutch assembly and more particularly to a flywheel clutch mechanism which is adapted to be arranged between the internal combustion engine crankshaft and the transmission of a motor vehicle. The clutch mechanism of the type to which the invention relates includes a separating clutch located between the crankshaft and the flywheel mass of the clutch mechanism, with the mechanism also including a starting and shifting clutch located between the flywheel mass and the transmission.

A flywheel clutch mechanism of the type to which the present invention relates is known, for example, from German Offenlegungsschrift 23 24 730. In this known flywheel clutch mechanism, a bearing of the flywheel mass of the clutch mechanism is provided in a direct or indirect connection at the end of the crankshaft of the combustion engine. This bearing mechanism requires a premounting operation of the flywheel clutch onto the crankshaft of the combustion engine.

Accordingly, the present invention is directed toward establishing a flywheel clutch mechanism which makes it possible to alleviate the burden or load upon the crankshaft bearing and which is also relatively easy to mount and assemble and which exhibits significant functional safety characteristics.

SUMMARY OF THE INVENTION

Briefly, the present invention may be described as a flywheel clutch mechanism which is interposed between the internal combustion engine crankshaft and the transmission of a motor vehicle, the clutch mechanism including a flywheel mass, a separating clutch interposed between the crankshaft and the flywheel mass, and a starting and shifting clutch interposed between the flywheel mass and the transmission. In accordance with the improvement of the present invention, in the assembly of the clutch mechanism, the flywheel mass together with the separating clutch and the starting and shifting clutch are all arranged to be premountable and supported on the transmission side thereof, and the clutch disc of the separating clutch and the crankshaft are joined together so as to be nonrotatable relative to each other by a connection formed by a rotatively interlocking connection means during the assembly of the combustion engine and the transmission.

Thus, in accordance with the invention, problems of the prior art are solved in that the flywheel mass together with both of the clutches is supported on the transmission side of the clutch mechanism thereby relieving stresses and load in the engine crankshaft. As a result of the bearing of the flywheel mass with both clutches on the transmission side, the crankshaft may be unburdened of additional axial and radial loads from the flywheel clutch and/or from the actuating forces occurring at the flywheel clutch. Further, there results a simpler clutch assembly on the transmission side since the elements of clutch actuation are normally arranged at the transmission or in the area of the transmission.

As a result of the arrangement of the invention, and in accordance with some of the more detailed aspects thereof, further advantages are provided. For example, it is possible in a practical manner and without difficulty to grease or lubricate the bearing point between the flywheel clutch and the transmission from the transmission side. As a result, the useful life of the flywheel clutch may be extended. A further advantage of the invention enables in conjunction with the arrangement of the clutch-release elements on the transmission side, a rather simple final assembly of the transmission and the combustion engine. In accordance with further aspects of the invention, it is made possible to provide a simple construction for the flywheel clutch as well as a relatively simple actuating mechanism. The control of the two clutches will occur one after the other simply by an increase in an actuating pressure in the system. By means of another embodiment of the invention, the hydraulic actuating system may be positioned in a central part of the flywheel mass in a particularly easy manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
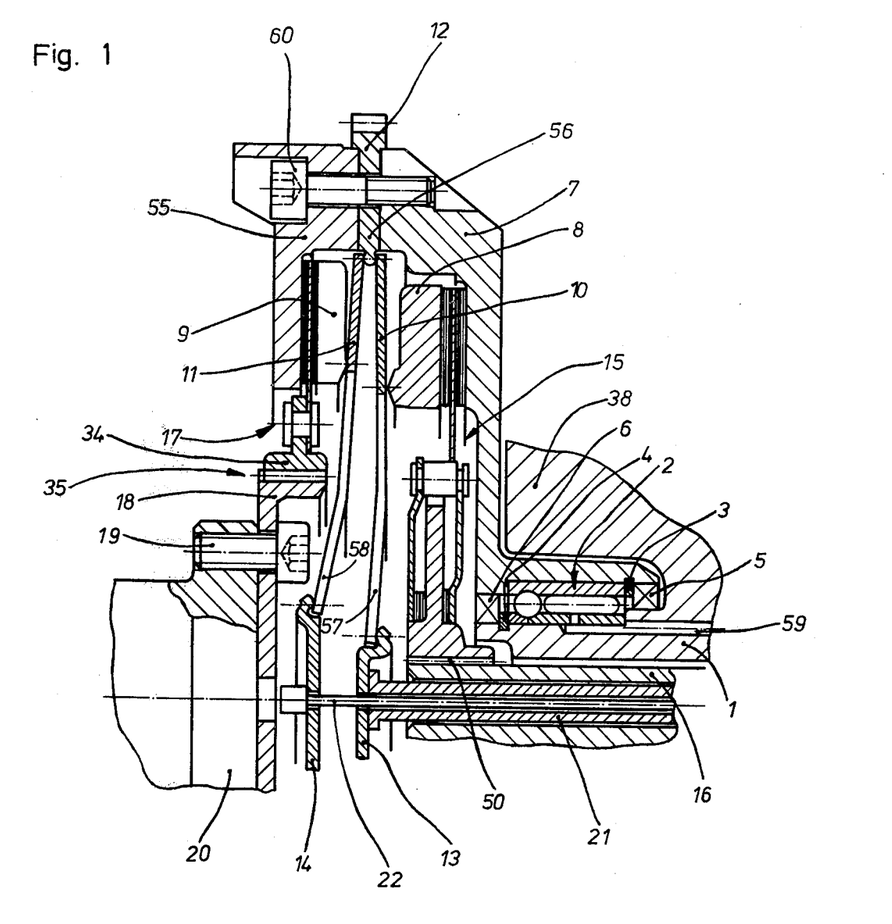
FIG. 1 is a longitudinal sectional view taken through a flywheel clutch mechanism in accordance with the present invention.

Referring now to the drawings, wherein similar parts are identified with like reference numerals throughout the various figures thereof, and referring more particularly to FIG. 1, there is shown a flywheel clutch mechanism in accordance with the invention wherein a flywheel mass together with a separating clutch and a starting and shifting clutch are mounted for support upon a tubular transmission extension 1.

As will be apparent from FIG. 1, the only connection of the flywheel clutch mechanism with the crankshaft 20 of the internal combustion engine is a rotatively interlocking connection 35 which essentially consists of the outer teeth of a flange 18 located on the crankshaft 20 and inner teeth in a hub 34 of a clutch disc 17 of the separating clutch.

As will be apparent from the disclosure which follows, the separating clutch is located to the left as seen in FIG. 1 on the engine side of the clutch mechanism and the starting and shifting clutch is located to the right as viewed in FIG. 1 on the transmission side of the clutch mechanism.

When the transmission and the combustion engine are placed in assembled juxtaposed position, the toothed connections including the outer teeth of the flange 18 and the inner teeth of the hub 34 will be pushed into engagement with one another. Moreover, all the parts of the flywheel clutch mechanism will be capable of being premounted and supported on a housing 38 of the transmission.

The flywheel mass of the clutch mechanism depicted in FIG. 1 consists essentially of three parts identified by the reference numerals 55, 12, and 7. The part 55 of the flywheel mass faces the combustion engine and simultaneously functions as a counterpressure plate for a clutch disc 17 and a pressure plate 9 of the separating clutch. The middle part 12 of the flywheel mass carries a starter gear rim radially outwardly and has a web 56 radially inwardly thereof against which there may be engaged the radially outer circumferential parts of two diaphragm springs 10 and 11. The part 7 of the flywheel mass faces the housing 38 of the transmission and functions as a counterpressure plate for a clutch disc 15 and a pressure plate 8 of the starting and shifting clutch. The flywheel mass part 7 facing the transmission housing 38 is rotatably mounted by means of a roller bearing 2 onto the tubular transmission extension 1 and is secured thereat against axial movement relative thereto. For this purpose, the roller bearing 2 is constructed as a combination bearing, that is, the bearing is suitable for transfer of radial and axial loads.

The roller bearing 2 is premounted with its outer ring in the part 7 and it is fixed in the axial direction by means of a securing ring 3. The bearing 2 is sealed off with relation to the transmission housing 38 by means of a seal 5.

The flywheel mass part 7 is pushed onto the tubular transmission extension 1 together with the roller bearing 2 where the inner ring of the roller bearing 2 comes to rest against a stop and as a subsequent step in the assembly procedure there follows an axial securing by means of a securing ring 4.

In the direction facing toward the clutch discs 15 and 17, the roller bearing 2 is sealed off by means of a seal 6. The roller bearing 2 may be constantly lubricated by being supplied with lubricating oil from the lubricating oil supply of the transmission through a grease duct 59 in the tubular transmission extension 1.

After the mounting of the part 7, there is subsequently performed mounting of the clutch disc 15 which is fastened over a gear tooth system 50 onto the output shaft 16 so as to be incapable of rotation relative to the output shaft 16 but so as to be axially movable relative thereto.

In the assembly procedure there subsequently follows mounting of the pressure plate 8, mounting of the diaphragm springs 10 and mounting of the middle part 12. Under spring tongues 57 of the diaphragm spring 10 there is placed a disc 13 which is supported on a hollow shaft 21 extending in the hollow output shaft 16, with the hollow shaft 21 being capable of being actuated at the end of the transmission facing away from the combustion engine.

As a result of these procedures, the starting and switching clutch will be assembled and there subsequently follows in the assembly procedure, assembly of the components of the separating clutch. Thus, there are subsequently mounted in operative position the diaphragm spring 11, a disc 14 for actuation of spring tongues 58 by means of a pull rod or pull wire 22, the pressure plate 9, the clutch disc 17 as well as the part 55 of the flywheel mass facing the combustion engine. The complete flywheel clutch mechanism will now be assembled together and held by means of several screws 60 which are spaced over the periphery of the assembly.

The flywheel clutch mechanism may, in accordance with the foregoing procedure, be premounted on the transmission housing 38 and may then be connected by assembly of the transmission and the combustion engine with the crankshaft 20 in such a manner as to be nonrotatable in relation thereto by pushing the hub 34 onto the flange 18. There is thus formed a rotatively interlocking connection 35 which may be made directly with the crankshaft 20 or, as represented, over the flange 18 screwed on at the crankshaft 20 by means of screws 19. The crankshaft 20 will thus be free of additional loads from the flywheel clutch mechanism.

Figure 2:
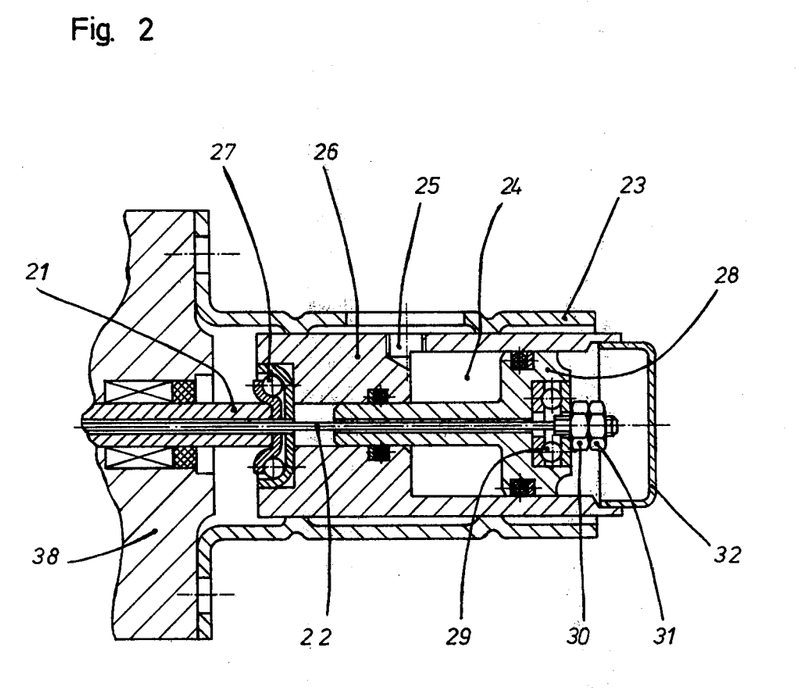
FIG. 2 is a longitudinal sectional view taken through the actuating system of the clutch mechanism located on the transmission side thereof.

In FIG. 2 there is shown in greater detail the connection on the transmission side of the clutch mechanism of FIG. 1. As shown in FIG. 2, the actuation of the flywheel clutch is represented as being effected from the inside of the transmission facing away from the combustion engine. Flanged onto the transmission housing 38 is a sleeve 23 which extends cylindrically in a line with and concentrically to the output shaft 16. In the sleeve 23 there extends a movable pressure cylinder 26 in which there is, in turn, movably arranged in a cylindrical bore hold a thrust piston 28. Between the pressure cylinder 26 and the thrust piston 28 there is defined a pressure chamber 24 which may be connected through a pressure connection 25 with a hydraulic clutch actuation means. Furthermore, the pressure cylinder 26 is connected in the axial direction over a thrust bearing 27 with the hollow shaft 21 which carries at its clutch side the disc 13 for actuation of the spring tongues 57.

The pull rod or cable 22 extends through the hollow shaft 21 into the thrust piston 28 where the pull rod is engaged over a thrust bearing 29 against the thrust piston 28. Two reverse nuts 30 and 31 enable exact adjustment of the pull rod 22 for the spring tongues 58.

The corresponding design of the two diaphragm springs 10 and 11 enables the two clutches to be actuated pressure-dependently and/or path-dependently, consecutively one after the other. Thus, with rise of pressure in the pressure chamber 24, the pressure cylinder 26 is first moved toward the left until it engages against the transmission housing 38 whereby the starting and shifting clutch is disengaged. Thereafter, with a further pressure rise, the thrust piston 28 is moved toward the right whereby the shifting clutch is actuated. It is of course possible also to actuate the two clutches independently of each other through a corresponding arrangement.

Figure 3:
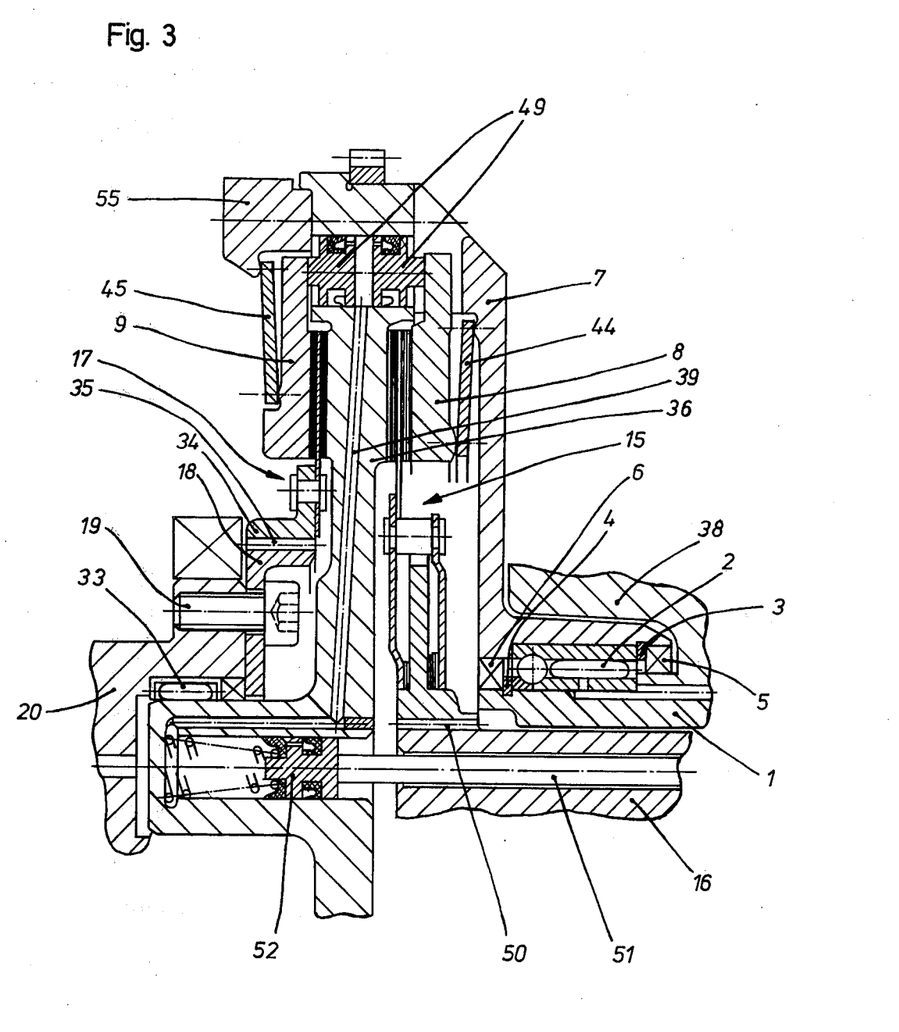
FIG. 3 is a longitudinal sectional view taken through a flywheel clutch mechanism having a hydraulic actuating system which is repositioned in the central part of the flywheel mass, in accordance with another embodiment of the invention.

Depicted in FIG. 3 is another embodiment of the invention whereby the flywheel clutch mechanism is nevertheless arranged with the entire flywheel mass also premounted upon the tubular transmission extension 1. The bearing of the part 7 is formed in a manner similar to that depicted in FIG. 1 so that a repetition of the description thereof is unnecessary. The assembly of the clutch mechanism itself is, however, different from that of the embodiment according to FIG. 1. The clutch release movements are also here oppositely directed, that is, they occur in opposition to each other, but a middle part 36 serves as a counterpressure plate for the clutch discs 15 and 17 as well as for their pressure plates 8 and 9. For this reason, the two parts 7 and 55 of the flywheel mass are also used for supporting diaphragm springs 44 and 45.

The middle part 36 is provided with bore holes which are arranged concentrically around the output shaft 16 radially outwardly of the friction faces of the clutch discs 15 and 17. These bore holes receive actuating pistons 49 which act respectively onto one or the other of the two pressure plates 8 and 9. Activation of the actuating pistons 49 occurs through one or more radial bore holes 39 in the middle part 36, these bore holes leading to a pressure chamber in the hub area of the middle part 36.

There is also arranged a hydraulic piston 52 which may be moved axially by means of an actuating rod 51. The actuating rod 51 extends in the hollow output shaft 16 and may be activated at the end of the transmission facing away from the combustion engine. In the present case the assembly of the flywheel clutch mechanism also occurs on the part 7 of the flywheel mass premounted on the transmission side and the connection whereby the flywheel clutch is made incapable of rotating relative to the crankshaft 20 occurs over a rotatively interlocking connection 35 between the hub 34 of the clutch disc 17 and the flange 18 on the crankshaft 20.

A roller bearing 33 between the middle part 36 and the crankshaft 20 may be provided in an opportune manner at the point indicated. In this arrangement, the crankshaft 20 is also unburdened of forces or loads which result from activation of the flywheel clutch mechanism.

Figure 4:
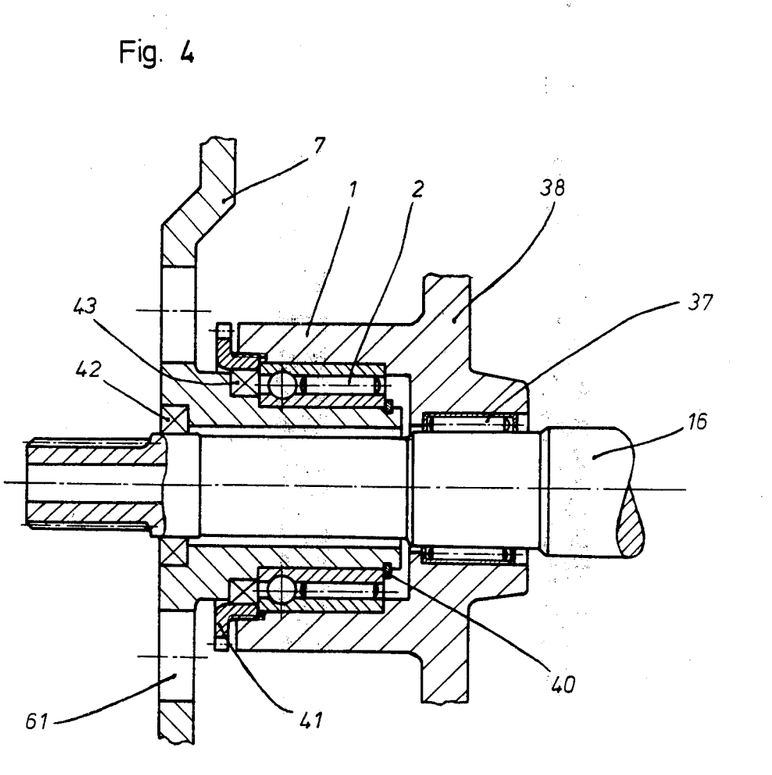
FIG. 4 is a sectional view of the transmission side of the clutch mechanism showing the bearing elements supporting the flywheel mass at the transmission side.

In FIG. 4 there is shown a bearing arrangement for the part 7 at the inner periphery of the tubular transmission extension 1 of the transmission housing 38. The roller bearing 2 is here premounted on the part 7 and is axially fixed by means of a securing ring 40 and is sealed from the exterior after the assembly is completed with a seal 43. A further seal 42 is arranged between the output shaft 16 and the part 7. For axial fixing of the part 7 by the outer ring of the roller bearing 2, there is provided in the transmission extension 1 a tightening nut 41 which is accessible to a corresponding opening 61 in the part 7. In the area of the bearing of the part 7 facing away from the combustion engine there is located a bearing 37 for support of the output shaft 16 in the transmission housing 38.

Figure 5:
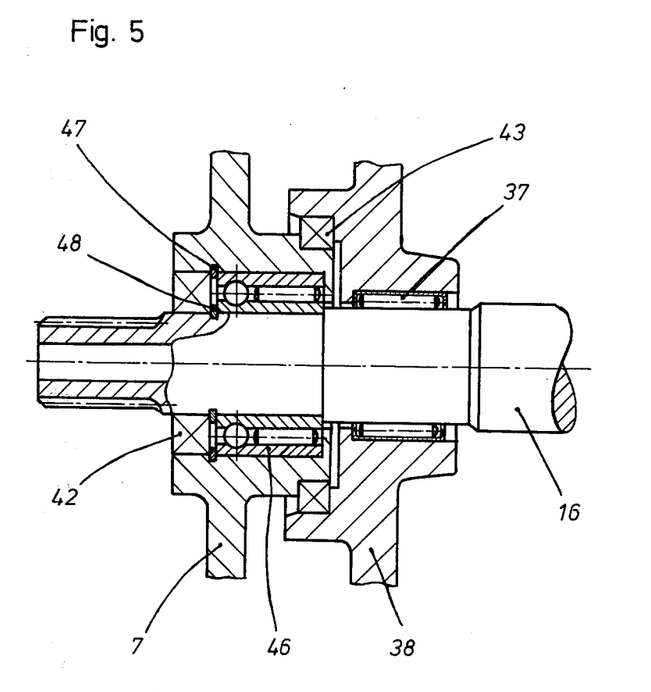
FIG. 5 is a sectional view of another embodiment of the bearing support of the flywheel mass on the output shaft.

FIG. 5 shows another embodiment of the bearing arrangement of the part 7 by means of a roller bearing 46 which provides support directly on the output shaft 16. Such a bearing arrangement may be achieved without especially elaborate procedures. Here again the bearing 46 is premounted on the part 7 and is fixed in the axial direction by means of a securing ring 47. Once the part 7 has been pushed onto the output shaft 16 with the roller bearing 46, fixing of the inner ring may occur by means of a securing ring 48 on the output shaft. Finally, there is mounted between the output shaft 16 and the part 7 a seal 42 for providing sealing from the exterior. Between the transmission housing 38, which carries the bearing 37 for bearing the output shaft 16, and the part 7, there is arranged a further seal 43 so that there is provided a connection between the two bearings 37 and 46 for supplying the bearing 46 with lubricating oil from the transmission.

Figure 6:
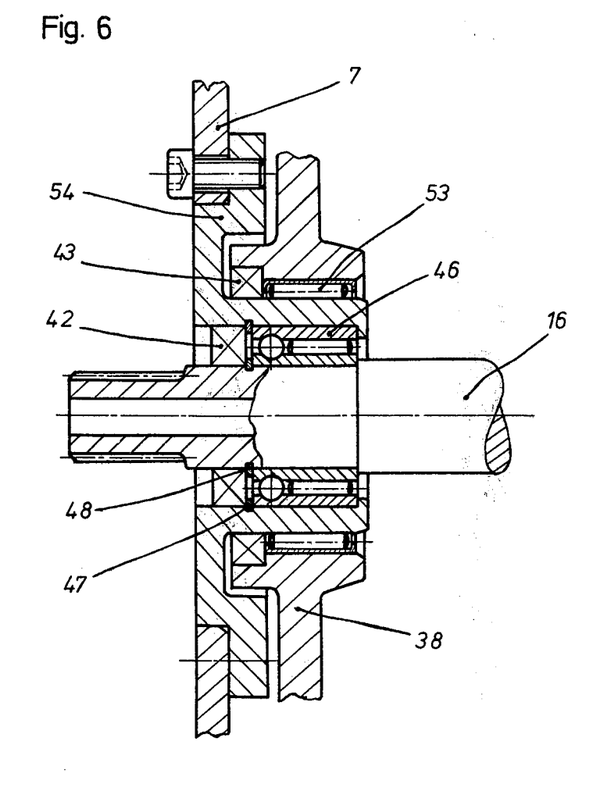
FIG. 6 is a sectional view of another embodiment of the bearing arrangement of the flywheel mass on the output shaft wherein the bearing in the transmission housing occurs in the same radial plane.

FIG. 6 depicts an especially space-saving bearing mounting arrangement which is smaller taken in the axial direction of the transmission shaft 16 and the part 7 in the transmission housing 38. In the present case, however, the part 7 is not mounted directly between the transmission housing 38 and the output shaft 16, but it is rather screwed on and removable from a separate flange 54. The flange 54 extends with a cylindrical extension between the two bearings 46 and 53 where the bearing 53 is mounted with its outer ring in the transmission housing 38 and, with its inner ring and/or with roller bodies, directly on the outer diameter of the flange 54. The bearing 46, in turn, is seated with its inner ring on the output shaft 16 and with its outer ring in a bore hole of the flange 54. The flange 54 is, in this case, preferably premounted along with the transmission and output shaft 16 so that the entire flywheel clutch mechanism may be screwed onto this flange directly through the part 7.

The two seals 42 and 43 are arranged toward the outside and both bearings 46 and 53 are supplied with lubricating oil from the transmission. Axial fixing occurs over two securing rings 47 and 48.

This bearing arrangement has the advantage of being especially space-saving in the axial direction and it is capable of simultaneously maintaining the usual advantages, such as simplicity in the clutch assembly, simplicity in the transmission and combustion engine assembly, high rotational speed strength through smaller axial size, and elimination of radial and axial loads on the crankshaft bearings and on the bearings of the output shaft from clutch actuating forces.

While specific embodiments of the invention have been shown and described in detail to illustrate the application of the inventive principles, it will be understood that the invention may be embodied otherwise without departing from such principles.

What is claimed is:

1. In a flywheel clutch mechanism interposed between the internal combustion engine crankshaft and the transmission of a motor vehicle wherein said clutch mechanism includes a flywheel mass, a separating clutch interposed between said crankshaft and said flywheel mass and a starting and shifting clutch interposed between said flywheel mass and said transmission, the improvement comprising that in the assembly of said clutch mechanism said flywheel mass, said separating clutch and said starting and shifting clutch are all arranged to be initially mounted on the transmission side of said clutch mechanism and operatively supported at said transmission side, and that the clutch disc of said separating clutch and said crankshaft are joined together so as to be nonrotatable relative to each other by a rotatively interlocking connection during the assembly of said combustion engine and said transmission.

2. A mechanism according to claim 1 wherein said transmission includes a tubular transmission extension and wherein said flywheel mass, said separating clutch and said starting and shifting clutch are all provided with support by bearing means on said tubular transmission extension.

3. A mechanism according to claim 2 wherein said support provided by said bearing means is provided on the outer periphery of said tubular transmission extension.

4. A mechanism according to claim 2 wherein said support by said bearing means is provided on the inner periphery of said tubular transmission extension.

5. A mechanism according to claim 1 wherein said flywheel mass, said separating clutch and said starting and shifting clutch are supported by bearing means on an output shaft of said clutch mechanism.

6. A mechanism according to claim 1 wherein said transmission includes a transmission housing and wherein said flywheel mass, said separating clutch and said starting and shifting clutch are supported by bearing means between said transmission housing and the output shaft of said clutch mechanism in two bearings arranged concentrically relative to each other and in one plane.

7. A mechanism according to claim 1 wherein said rotatively interlocking connection is constructed from inner teeth formed on a hub of said clutch disc of said separating clutch and from outer teeth arranged on said crankshaft.

8. A mechanism according to claim 7 wherein said outer teeth are formed on a flange which is connected onto said crankshaft by a threaded fastener.

9. A mechanism according to claim 1 wherein said flywheel mass, said separating clutch and said starting and shifting clutch are supported on said transmission side thereof by bearing means which are constructed as roller bearings and which receive lubrication from said transmission.

10. A mechanism according to claim 1 wherein said separating clutch and said starting and shifting clutch are actuated by actuating means which include pressure plates and wherein actuation of both said clutches occurs through oppositely directed movements of said pressure plates.

11. A mechanism according to claim 1 wherein said flywheel mass comprises a first part, a second middle part and a third part, wherein said second middle part is formed with a starter gear rim arranged on the outside thereof and with a web arranged radially inwardly thereof adapted to support a pair of diaphragm springs of said separating clutch and said starting and shifting clutch respectively, said web supporting said diaphragm springs at their outer diameters, wherein said first part is arranged closest to said combustion engine and is adapted to act as a counterpressure plate of said clutch disc of said separating clutch and wherein said third part is arranged closest to said transmission and is adapted to act as a counterpressure plate of the clutch disc of said starting and shifting clutch, said third part being equipped with bearing means for supporting said flywheel mass, said separating clutch and said starting and shifting clutch on the transmission side of said clutch mechanism.

12. A mechanism according to claim 11 further comprising a first and a second actuating element each extending concentrically with an output shaft of said clutch mechanism for actuation of said clutches, and wherein said diaphragm springs include inwardly facing spring tongues adapted to be actuated by said actuating elements for movement in directions toward and away from each other for actuation, respectively, of said separating clutch and said starting and shifting clutch.

13. A mechanism according to claim 1 further including hydraulic clutch actuation means for said separating clutch and said starting and shifting clutch, said hydraulic clutch actuation means including a thrust piston movably arranged within a movable pressure cylinder, said pressure cylinder being connected with ends of a diaphragm spring of said starting and shifting clutch by means of a hollow shaft having a disc thereon and with said thrust piston being connected with ends of a diaphragm spring of said separating clutch by means of a pull rod having a disc thereon whereby pressure change in a pressure chamber defined in said hydraulic clutch actuation means operates to actuate said starting and shifting clutch and said separating clutch.

14. A mechanism according to claim 10 wherein said flywheel mass comprises a first part, a second middle part and a third part, wherein said second middle part functions as a counterpressure plate having arranged radially outwardly thereof a starter gear rim constructed as a disc and provided with axially movable actuating pistons arranged radially outwardly of clutch discs of said separating clutch and of said starting and shifting clutch, said actuating pistons acting on said pressure plates, respectively, in opposite directions, said first part being provided closest to said combustion engine and adapted to act as a support for a diaphragm spring of said separating clutch, said third part being provided closest to said transmission and adapted to act as a support for a diaphragm spring of said starting and shifting clutch, said third part being simultaneously equipped with bearing means for supporting said flywheel mass, said separating clutch and said starting and shifting clutch on the transmission side thereof.

15. A mechanism according to claim 12 further comprising roller bearing means supporting said second middle part of said flywheel mass concentrically on said crankshaft, said middle part having in this area a hydraulic piston which may be actuated by means of a transmission shaft of said transmission, said hydraulic piston being connected with an actuating piston over corresponding radial bore holes.

* * * * *